United States Patent
Hori et al.

(10) Patent No.: US 10,077,072 B2
(45) Date of Patent: Sep. 18, 2018

(54) VEHICLE STEERING DEVICE AND VEHICLE STEERING CONTROL METHOD WITH REDUCED LATERAL SPEED

(71) Applicant: Mitsubishi Electric Corporation, Tokyo (JP)

(72) Inventors: Yasuyoshi Hori, Tokyo (JP); Yukiyasu Akemi, Tokyo (JP); Masaya Endo, Tokyo (JP); Hideyuki Tanaka, Tokyo (JP); Takayuki Tanaka, Tokyo (JP); Takahiro Urabe, Tokyo (JP); Kouhei Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 245 days.

(21) Appl. No.: 14/856,135

(22) Filed: Sep. 16, 2015

(65) Prior Publication Data

US 2016/0288830 A1 Oct. 6, 2016

(30) Foreign Application Priority Data

Apr. 1, 2015 (JP) .................................. 2015-075125

(51) Int. Cl.
*B62D 15/02* (2006.01)
*B62D 5/04* (2006.01)

(52) U.S. Cl.
CPC ......... *B62D 15/025* (2013.01); *B62D 5/0463* (2013.01); *B62D 15/021* (2013.01)

(58) Field of Classification Search
None
See application file for complete search history.

(56) References Cited

U.S. PATENT DOCUMENTS 6,131,688 A * 10/2000 Fukada .................. B60T 8/175
                                                                  180/197
7,746,221 B2 * 6/2010 Jung .................... B62D 15/025
                                                                  340/435

(Continued)

FOREIGN PATENT DOCUMENTS

DE     102010007598 A1    1/2011
JP        2001-1921 A       1/2001

(Continued)

OTHER PUBLICATIONS

Communication dated Mar. 15, 2016 from the Japanese Patent Office in counterpart application No. 2015-075125.

(Continued)

*Primary Examiner* — John Olszewski
*Assistant Examiner* — Navid Ziaeianmehdizadeh
(74) *Attorney, Agent, or Firm* — Sughrue Mion, PLLC; Richard C. Turner

(57) ABSTRACT

Provided are a vehicle steering device and the like, which are capable of converging a lateral displacement at a forward gazing-point distance to a target travel line with simple control. A target travel line for a vehicle to travel by following a travel path recognized from an image taken by a camera or the like is set. A lateral speed, which is a change amount of the lateral displacement that is a difference between a position of the target travel line at the forward gazing-point distance and a position of the vehicle, is controlled so that the lateral displacement is reduced. A target steering angle is calculated based on the lateral speed, and a steering angle of the vehicle is controlled based on the calculated target steering angle.

19 Claims, 7 Drawing Sheets

(56) References Cited

U.S. PATENT DOCUMENTS

| | | | | |
|---|---|---|---|---|
| 8,195,363 B2* | 6/2012 | Isaji | B60W 30/09 | 701/301 |
| 8,836,492 B2* | 9/2014 | Akiyama | B60W 30/18145 | 340/436 |
| 8,965,633 B2* | 2/2015 | Lee | B62D 1/286 | 701/41 |
| 9,321,462 B2* | 4/2016 | Terazawa | B60W 10/20 | |
| 9,567,004 B1* | 2/2017 | Jhang | B62D 6/003 | |
| 2001/0027893 A1* | 10/2001 | Nishizaki | B60T 8/172 | 180/409 |
| 2004/0183663 A1* | 9/2004 | Shimakage | G06T 7/73 | 340/436 |
| 2004/0204808 A1* | 10/2004 | Satoh | B62D 6/005 | 701/41 |
| 2007/0100551 A1* | 5/2007 | Ishikura | B60T 8/17551 | 701/301 |
| 2008/0091318 A1* | 4/2008 | Deng | B62D 6/003 | 701/41 |
| 2009/0157263 A1* | 6/2009 | Shin | B62D 5/0481 | 701/43 |
| 2009/0287376 A1* | 11/2009 | Aso | B60W 10/12 | 701/42 |
| 2011/0015850 A1* | 1/2011 | Tange | B60W 30/12 | 701/116 |
| 2013/0274985 A1* | 10/2013 | Lee | B60W 10/20 | 701/23 |
| 2014/0180543 A1* | 6/2014 | Ueda | B62D 15/025 | 701/41 |
| 2015/0066244 A1* | 3/2015 | Minemura | B62D 15/0265 | 701/1 |
| 2015/0151786 A1* | 6/2015 | Fujii | B62D 6/008 | 701/42 |
| 2015/0344068 A1* | 12/2015 | Taniguchi | B62D 15/025 | 701/41 |
| 2016/0107682 A1* | 4/2016 | Tan | B62D 6/00 | 701/41 |

FOREIGN PATENT DOCUMENTS

| | | |
|---|---|---|
| JP | 2003-26017 A | 1/2003 |
| JP | 2006-151134 A | 6/2006 |
| JP | 2007-302204 A | 11/2007 |
| JP | 2010-18268 A | 1/2010 |
| JP | 2010-111246 A | 5/2010 |
| JP | 2011-168168 A | 9/2011 |
| JP | 2013-212839 A | 10/2013 |
| JP | 2014-162420 A | 9/2014 |

OTHER PUBLICATIONS

Communication dated Jan. 24, 2017, issued by the German Patent Office in counterpart German Application No. 102015220380.8.

* cited by examiner x, y : VEHICLE-FIXED COORDINATE SYSTEM
X,Y : GROUND-FIXED COORDINATE SYSTEM

VEHICLE STEERING DEVICE AND VEHICLE STEERING CONTROL METHOD WITH REDUCED LATERAL SPEED

BACKGROUND OF THE INVENTION

1. Field of the Invention

The present invention relates to a vehicle steering device and the like having a function of providing a steering assistance to steered wheels so that a vehicle travels while following a set target travel line.

2. Description of the Related Art

As a related-art vehicle steering device having a lane keeping assistance function, in Japanese Patent Application Laid-open No. 2001-001921, there is disclosed a vehicle steering device configured so that, when a steering assistance section is controlled so that an estimated travel locus approaches a target locus set based on a travel path shape of the vehicle, a control gain for controlling the travel locus to approach the target locus is corrected based on a curvature.

This related-art device corrects the control gain for controlling the travel locus to approach the target locus based on the detected curvature, and hence provides such an effect that the control gain for controlling the travel locus to approach the target locus is corrected based on the curvature of the vehicle travel path to prevent a driver from feeling a sense of discomfort during a trace of a travel line.

However, in the device described in Japanese Patent Application Laid-open No. 2001-001921, there is disclosed only a method of multiplying a future lateral deviation by the control gain for control torque setting for the steering assistance section, and it is not clear that the travel locus converges to the target locus. Moreover, for example, there is no description of a yaw rate of the vehicle, and the yaw rate is not considered. As a result, the travel along the target travel line may not be achieved.

SUMMARY OF THE INVENTION

The present invention has been made in view of the above-mentioned problem of the related-art device, and therefore has an object to provide a vehicle steering device and the like, which are capable of converging a lateral displacement at a forward gazing-point distance to a target travel line with simple control.

According to one embodiment of the present invention, there are provided a vehicle steering device and the like, including: a travel path recognition section for recognizing a travel path on which a vehicle travels; a target travel line setting section for setting a target travel line used by the vehicle to travel while following the travel path; a lateral displacement calculation section for detecting a lateral displacement, which is a difference between a position of the target travel line and a position of the vehicle at a forward gazing-point distance of the vehicle; a target steering angle calculation section for calculating a target steering angle so as to reduce the lateral displacement; and a steering control section for controlling a steering angle of the vehicle based on the target steering angle calculated by the target steering angle calculation section, in which the target steering angle calculation section controls a lateral speed, which is a change amount of the lateral displacement, so as to reduce the lateral displacement, and calculates the target steering angle based on the lateral speed.

According to the one embodiment of the present invention, the target steering angle is calculated based on the lateral speed controlled so as to reduce the lateral displacement, and the lateral displacement can thus be converged to the target travel line with the simple control.

DETAILED DESCRIPTION OF THE PREFERRED EMBODIMENTS

Figure 1:
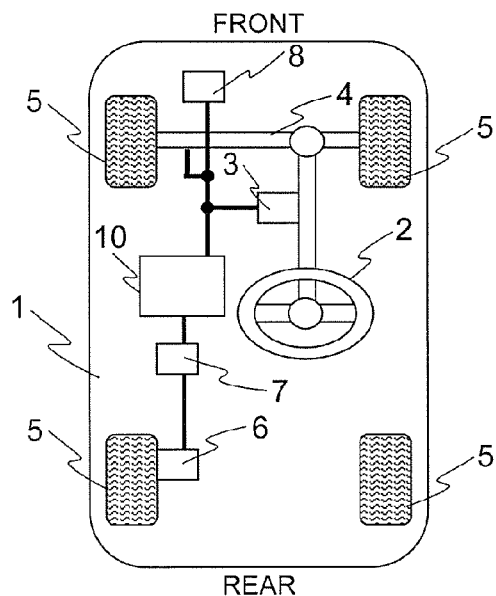
FIG. 1 is a configuration diagram for illustrating an example of a steering system configuration for a vehicle steering device according to a first embodiment of the present invention.

A description is now given of a vehicle steering device and the like according to respective embodiments of the present invention referring to the drawings. Throughout the respective embodiments, the same or corresponding components are denoted by the same reference symbols, and an overlapping description is omitted.

First Embodiment

FIG. 1 is a configuration diagram for illustrating an example of a steering system configuration for a vehicle steering device according to a first embodiment of the present invention.

In FIG. 1, right and left front tires 5 are steered by a steering device 4 coupled to a steering wheel 2. A motor 3 is coupled to the steering device 4 as in a general electric power steering device, and torque generated by the motor 3 can be applied to the steering device 4. The motor 3 is driven based on a target current output by a control unit 10 to be described later.

Regarding detection of a vehicle state, a vehicle speed of a vehicle 1 is detected by a wheel speed sensor 6, and a yaw moment is detected by a yaw rate sensor 7. Moreover, a camera 8 is installed in the vicinity of a room mirror in the vehicle 1, and takes a forward image of the vehicle through a front windshield of the vehicle to output forward travel path information.

The vehicle speed sensor 6, the yaw rate sensor 7, the camera 8, and the motor 3 are connected to the control unit 10. The control unit 10 inputs signals from the respective sensors and the forward image information from the camera 8, and outputs a target current, which is a drive signal for the motor 3. Moreover, the control unit 10 may have a control function for a general electric power steering device.

Figure 11:
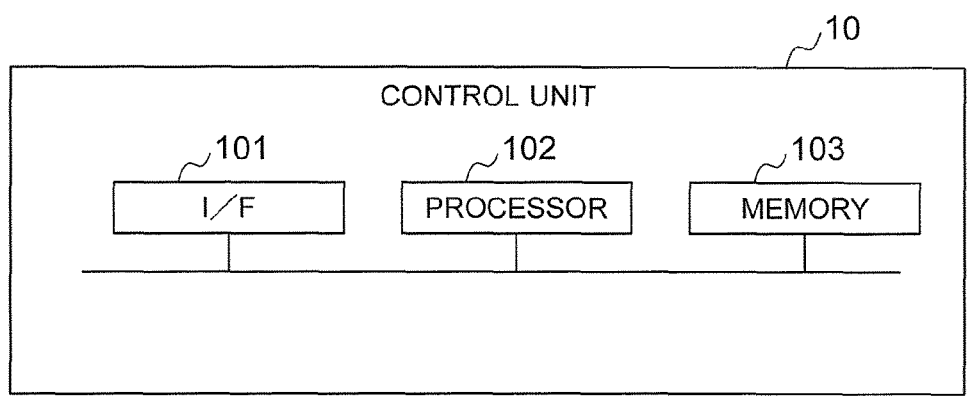
FIG. 11 is a diagram for schematically illustrating an example of a hardware configuration of the control unit of the vehicle steering device according to the present invention.

FIG. 11 is a diagram for schematically illustrating an example of a hardware configuration of the control unit 10 of FIG. 1. An interface (I/F) 101 carries out input/output control for signals to/from the respective sensors 6 and 7, the camera 8, the motor 3, and other such external devices. A processor 102 carries out various types of processing in accordance with programs stored in a memory 103. The memory 103 stores the programs, as well as data used for the respective pieces of processing, processing results, and the like. The I/F 101, the processor 102, and the memory 103 are connected to one another via a bus.

Figure 2:
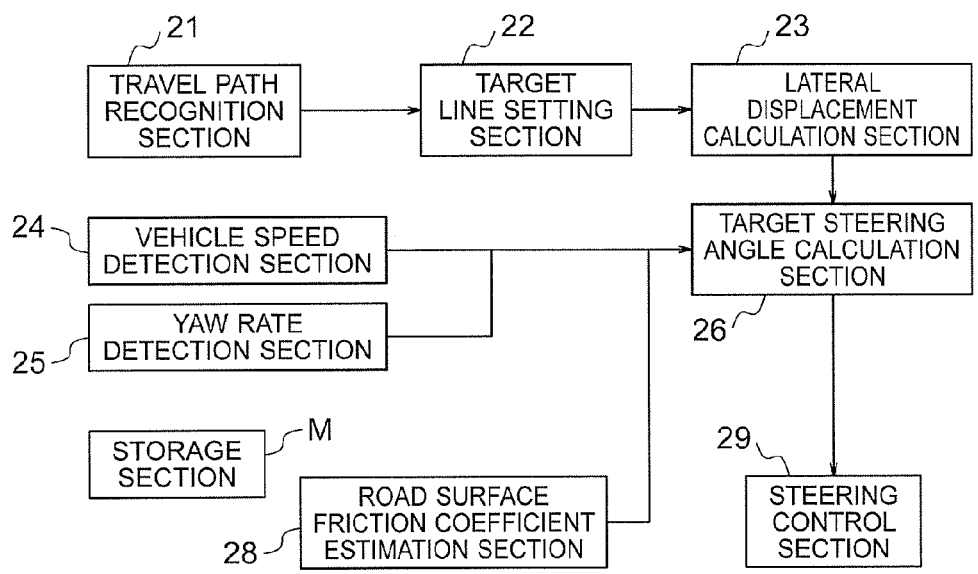
FIG. 2 is a functional block diagram of the vehicle steering device and a control unit of FIG. 1.

FIG. 2 is a functional block diagram of the vehicle steering device and the control unit 10 of FIG. 1. In the following description, FIG. 2 is a functional block diagram of the control unit 10. Processing by the respective functional blocks is carried out by the processor 102 in accordance with the programs stored in the memory 103 of FIG. 11. Note that, as the hardware configuration of the control unit 10, in place of the configuration using the processor of FIG. 11, the control unit 10 may be constructed by a digital circuit such as an application specific integrated circuit (ASIC) for carrying out the processing of each of the functional blocks of FIG. 2.

Note that, a storage section M corresponds to the memory 103 of FIG. 11.

In FIG. 2, a travel path recognition section 21 inputs the forward image data taken by the camera 8 in order to recognize the travel path, and provides forward travel path information to a target travel line setting section 22, a lateral displacement calculation section 23, and a target steering angle calculation section 26.

The forward travel path information is acquired as described below. The travel path recognition section 21 uses a publicly known method to extract lane boundary lines such as white lines on both right and left sides of a road from the forward image taken by the camera 8. Then, the forward travel path information is acquired from a result of detecting distances from an own vehicle position to the lane boundary lines at a forward gazing-point distance and a target travel line inclination eLd at the forward gazing-point distance based on a lane boundary line inclination.

The target travel line inclination eLd at the forward gazing-point distance is detected based on the lane boundary line inclination at the forward gazing-point distance. One value is enough for the lane boundary line inclination. When the lane boundary line inclinations on both sides can be acquired, the lane boundary line inclinations only need to be made into one value by averaging or the like. When the lane boundary line inclination only on one side can be acquired, the value only needs to be directly used. Moreover, a travel path width is also calculated based on distances from the own vehicle position to the lane boundary lines on both sides. When the lane boundary line only on one side is detected, it is preferred that the travel path width be set to a general travel path width (such as 3.5 m).

The target travel line setting section 22 sets a target travel line, which serves as a target when the vehicle is controlled to travel while following the travel path, in the travel path based on the travel path width acquired by the travel path recognition section 21. In this embodiment, the target travel line is set to a position departed by a set distance (such as ½ of the travel path width) from the lane boundary line on the right side. However, the target travel line is not limited to the setting of this embodiment, and may appropriately be changed depending on the preference of the driver.

The lateral displacement calculation section 23 calculates a lateral displacement at the forward gazing-point distance based on the distance of the own vehicle from the lane boundary line acquired by the travel path recognition section 21, and the target travel line set by the target travel line setting section 22. If the distance from the lane boundary line on the right side is available, the lateral displacement is a value acquired by subtracting the position of the target travel line from the value of the distance. In this case, when the vehicle is on the left side with respect to the target travel line, the value is positive. If (the distance from) the lane boundary line on the right side cannot be detected and only (the distance from) the lane boundary line on the left side is detected, a value acquired by subtracting the distance from the lane boundary line on the left side from the travel path width is the distance from the lane boundary line on the right side, and hence a value acquired by subtracting the position of the target travel line from this value only needs to be set as the lateral displacement.

The vehicle speed detection section 24 inputs a vehicle speed signal of the vehicle speed detected by the wheel speed sensor 6, and provides the vehicle speed to the target steering angle calculation section 26. Similarly, the yaw rate detection section 25 inputs a yaw moment signal of the yaw moment of the vehicle detected by the yaw rate sensor 7, and provides the yaw moment to the target steering angle calculation section 26. Moreover, a road surface friction coefficient estimation section 28 uses a publicly known method (for example, refer to Japanese Patent Application Laid-open No. 2010-111246) to estimate a road surface friction coefficient, and provides the road surface friction coefficient to the target steering angle calculation section 26. The road surface friction coefficient is acquired, for example, from a road surface reaction torque signal that is detected and input by a road surface reaction torque sensor (not shown in detail) included in the steering device 4.

The target steering angle calculation section 26 calculates a target steering angle based on the acquired information, and provides the target steering angle to a steering control section 29.

Regarding the calculation of the target steering angle, such a steering angle that a difference between the own vehicle position at the forward gazing-point distance and the target travel line approaches zero in order to control the own vehicle position to follow the target travel line only needs to be acquired as the target steering angle. Thus, for the lateral displacement yLd, which is the difference between the target travel line and the own vehicle position at the forward gazing-point distance, a lateral speed y'Ld, which is a change speed of the lateral displacement yLd, is considered. If the lateral speed y'Ld is controlled so that the lateral displacement yLd decreases, the lateral displacement yLd approaches zero, and hence the lateral speed y'Ld only needs to be controlled so as to satisfy Expression (1). Note that, in Expression (1), y'Ld is the lateral speed at the forward gazing point, yLd is the lateral displacement between the target travel line and the own vehicle position at the forward gazing point, λ is an attenuation characteristic parameter of yLd taking a positive value. As λ increases, response of the control increases, but stability tends to decrease.

$$y'Ld = -\lambda \cdot yLd \quad \text{Expression (1)}$$

Figure 3:
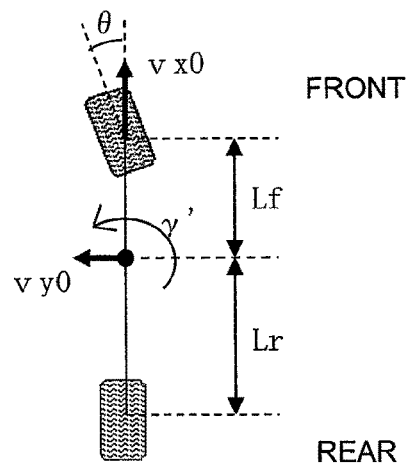
FIG. 3 is a diagram for illustrating a two-wheel model in the vehicle steering device according to the first embodiment of the present invention.

Now, in order to acquire the lateral speed y'Ld, a motion equation of the two-wheel model in a coordinate system fixed to the vehicle is considered. FIG. 3 is a diagram for illustrating the two-wheel model, and the motion equation of the two-wheel model is given by Expression (2).

$$m(v'_{y0} + v_{x0} \cdot \gamma') = -2C_f \left( \frac{v_{y0} + L_f \cdot \gamma'}{v_{x0}} - \theta \right) - 2C_r \left( \frac{v_{y0} - L_r \cdot \gamma'}{v_{x0}} \right) \quad (2)$$

where m represents a vehicle weight, $v_{x0}$ and $v_{y0}$ represent the vehicle longitudinal speed and lateral speed at the vehicle center of gravity, $V'_{y0}$ represents a vehicle lateral acceleration at the vehicle center of gravity, γ' represents the yaw rate, Lf represents a distance between the center of gravity and a front wheel axle, Lr represents a distance between the center of gravity and a rear wheel axle, Cf represents front wheel side force/stiffness, Cr represents rear wheel side force/stiffness, and θ represents a (target) steering angle. Note that, the vehicle lateral speed $v_{y0}$ and the steering angle θ are positive in the left direction, and the yaw rate γ' is positive in the counterclockwise direction. Moreover, "'" represents a temporal change acquired by differentiation, and, for example, the displacement is converted into the speed, and the speed is converted into the acceleration (the same applies hereinafter).

On the other hand, coordinate components $[x_1, y_1]^T$ and $[x_0, y_0]^T$ of the target travel line position P1 at the forward gazing-point distance and the vehicle center of gravity P0 in the vehicle-fixed coordinate system, respectively, are represented as Expression (3). In Expression (3), Ld represents the forward gazing-point distance.

$$\begin{bmatrix} x_1 \\ y_1 \end{bmatrix} = \begin{bmatrix} x_0 \\ y_0 \end{bmatrix} + \begin{bmatrix} Ld \\ y_{Ld} \end{bmatrix} \quad (3)$$

Figure 4:
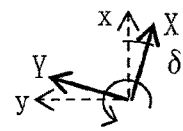
FIG. 4 is a diagram for illustrating a vehicle-fixed coordinate system and a ground-fixed coordinate system for describing control by the vehicle steering device according to the first embodiment of the present invention.
Figure 5:
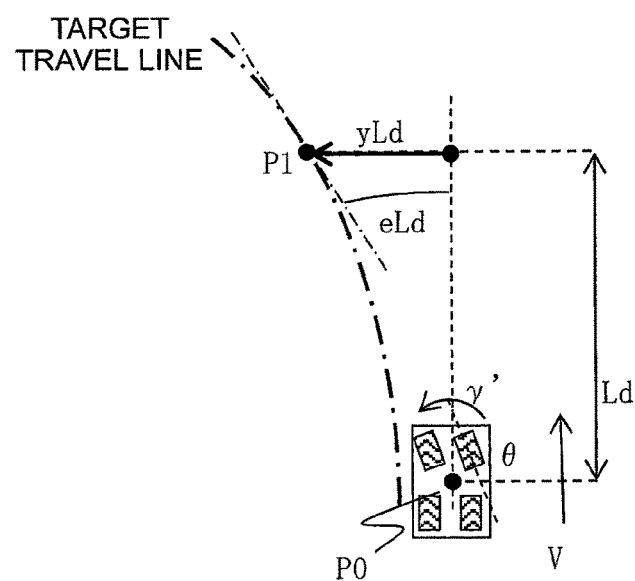
FIG. 5 is a diagram for illustrating respective parameters for describing the control by the vehicle steering device according to the first embodiment of the present invention.

Now, a ground-fixed coordinate system is considered. FIG. 4 is a diagram for illustrating the vehicle-fixed coordinate system [x,y] (broken line) and the ground-fixed coordinate system [X,Y] (solid line). FIG. 5 is a diagram for illustrating respective parameters.

The target travel line represented by the long dashed short dashed line of FIG. 5 extends, for example, along the center of the width of a road. Thus, in FIG. 5, a state in which the vehicle is now traveling on the right side of the travel path is illustrated. Moreover, the lateral displacement yLd is a difference between a position (center position) of the vehicle at the forward gazing-point distance Ld of the vehicle and the position of the target travel line in a direction orthogonal to the (current) travel direction of the vehicle.

The yaw rate γ' of the vehicle is defined as positive in the counterclockwise direction. When the vehicle-fixed coordinate system is at a position rotated counterclockwise by δ with respect to the ground-fixed coordinate system, the direction of δ on this occasion is positive (the direction when the vehicle rotates counterclockwise with respect to the ground is positive). As a result, when Expression (3) is translated from the vehicle-fixed coordinate system into the ground-fixed coordinate system, coordinate components $[X_1, Y_1]^T$ and $[X_0, Y_0]^T$ in the ground-fixed coordinate system are represented by Expression (4).

$$\begin{bmatrix} \cos\delta & -\sin\delta \\ \sin\delta & \cos\delta \end{bmatrix} \begin{bmatrix} x_1 \\ y_1 \end{bmatrix} = \begin{bmatrix} \cos\delta & -\sin\delta \\ \sin\delta & \cos\delta \end{bmatrix} \begin{bmatrix} x_0 \\ y_0 \end{bmatrix} + \begin{bmatrix} \cos\delta & -\sin\delta \\ \sin\delta & \cos\delta \end{bmatrix} \begin{bmatrix} Ld \\ y_{Ld} \end{bmatrix} \quad (4)$$

$$\begin{bmatrix} X_1 \\ Y_1 \end{bmatrix} = \begin{bmatrix} X_0 \\ Y_0 \end{bmatrix} + \begin{bmatrix} \cos\delta & -\sin\delta \\ \sin\delta & \cos\delta \end{bmatrix} \begin{bmatrix} Ld \\ y_{Ld} \end{bmatrix}$$

Moreover, coordinate components $[v_{x1}, v_{y1}]^T$ of a moving speed of the target travel line position P1 in the vehicle-fixed coordinate system can be represented as Expression (5) with use of $[X_1, Y_1]^T$ in the ground-fixed coordinate system.

$$\begin{bmatrix} v_{x1} \\ v_{y1} \end{bmatrix} = \begin{bmatrix} \cos\delta & \sin\delta \\ -\sin\delta & \cos\delta \end{bmatrix} \begin{bmatrix} X'_1 \\ Y'_1 \end{bmatrix} \quad (5)$$

In order to assign Expression (4) to Expression (5), Expression (4) is differentiated into Expression (6).

$$\begin{bmatrix} X'_1 \\ Y'_1 \end{bmatrix} = \begin{bmatrix} X'_0 \\ Y'_0 \end{bmatrix} + \begin{bmatrix} -Ld \cdot \delta' \cdot \sin\delta - y'_{Ld} \cdot \sin\delta - y_{Ld} \cdot \delta' \cos\delta \\ Ld \cdot \delta' \cdot \cos\delta + y'_{Ld} \cdot \cos\delta - y_{Ld} \cdot \delta' \sin\delta \end{bmatrix} \quad (6)$$

The ground-fixed coordinate system $[X'_0, Y'_0]^T$ of Expression (6) is represented as Expression (7) in the vehicle-fixed coordinate system $[v_{x0}, v_{y0}]^T$.

$$\begin{bmatrix} X'_0 \\ Y'_0 \end{bmatrix} = \begin{bmatrix} \cos\delta & -\sin\delta \\ \sin\delta & \cos\delta \end{bmatrix} \begin{bmatrix} v_{x0} \\ v_{y0} \end{bmatrix} \quad (7)$$

When Expression (6) and Expression (7) are assigned to Expression (5), the moving speed $[v_{x1}, v_{y1}]^T$ of the target travel line position P1 is represented as Expression (8) in the vehicle-fixed coordinate system by considering that the yaw rate of the vehicle is equal independently of the coordinate system and thus δ'=γ' is established.

$$\begin{bmatrix} v_{x1} \\ v_{y1} \end{bmatrix} = \begin{bmatrix} v_{x0} - y_{Ld} \cdot \gamma' \\ v_{y0} + y'_{Ld} + Ld \cdot \gamma' \end{bmatrix} \quad (8)$$

Moreover, a relationship between an inclination eLd of a tangent at the target travel line position P1 and the speed of the target travel line position P1 is represented as Expression (9) in the vehicle-fixed coordinate system.

$$\tan(e_{Ld}) = \frac{v_{y1}}{v_{x1}} \quad (9)$$

Expression (9) is assigned to $v_{y1}$ in the second row of Expression (8), and Expression (8) is rearranged. It is assumed that the curvature of the travel path is gentle, and $\tan(eLd) \approx eLd$ is established based on $|eLd| \ll 1$. Then, the vehicle lateral speed y'Ld with respect to the target travel line is represented as follows in the vehicle-fixed coordinate system.

$$Y'_{Ld} = v_{x1} \cdot e_{Ld} - v_{y0} - Ld \cdot \gamma' \quad (10)$$

In order to assign Expression (10) to Expression (2), Expression (10) is solved in terms of $v_{y0}$ to acquire Expression (11). Further, Expression (11) is differentiated and $v'_{x1} \approx 0$ is taken into consideration on the assumption that the vehicle speed does not abruptly change. Then, Expression (12) is acquired.

$$v_{y0} = v_{x1} \cdot e_{Ld} - Ld \cdot \gamma' - y'_{Ld} \quad (11)$$

$$v'_{y0} = v_{x1} \cdot e'_{Ld} - Ld \cdot \gamma'' - y''_{Ld} \quad (12)$$

When Expression (11) and Expression (12) are assigned to Expression (2), and it is assumed that the vehicle longitudinal speed>>lateral speed and the influence of the yaw rate on the vehicle speed is minute, the speeds of the vehicle in the vehicle-fixed coordinate system and the ground-fixed coordinate system can be considered to be equal to each other. Moreover, when it is assumed that the vehicle speed change is also minute, $v_{x0} = v_{x1}$ is established, and the vehicle longitudinal speed is constant in the ground-fixed coordinate system. Thus, when the vehicle speed in the ground-fixed coordinate system (equal to the vehicle speed detected by the wheel speed sensor 6 and input to the vehicle speed detection section 24) is set to V, it can be considered that $V = v_{x0} = v_{x1}$ is established, and hence Expression (13), which is a two-wheel model with the forward gazing-point distance being a reference, is acquired.

$$m(V \cdot e'Ld - Ld \cdot \gamma'' - y''Ld + V \cdot \gamma') = \quad (13)$$
$$-\frac{2(C_f + C_r)}{V}(V \cdot eLd - Ld \cdot \gamma' - y'Ld) -$$
$$\frac{2(C_f \cdot L_f - C_r \cdot L_r)}{V}\gamma' + 2C_f \cdot \theta$$

When Expression (13) is solved in terms of the lateral speed y'Ld, Expression (14) is acquired.

$$y'Ld = V \cdot eLd + \left(-Ld + \frac{C_f \cdot L_f - C_r \cdot L_r}{C_f + C_r}\right) \cdot \gamma' - \frac{C_f \cdot V}{C_f + C_r}\theta + \quad (14)$$
$$\frac{m \cdot V^2}{2(C_f + C_r)}\gamma' + \frac{m \cdot V}{2(C_f + C_r)}(V \cdot e'Ld - Ld \cdot \gamma'' - y''Ld)$$

On this occasion, y"Ld in Expression (14) is an acceleration in the vehicle lateral direction. When a state in which y"Ld is generated on the assumption that an extreme sideslip angle such as a slip is not generated can be considered to be identical to a curve travel state, y"Ld is an acceleration of a circular motion, and is considered as Expression (15). A part of terms of Expression (14) can be canceled out by assigning Expression (15) to Expression (14).

$$y''Ld = \frac{V^2}{r} = V \cdot \gamma' \quad (15)$$

Moreover, the values of e'Ld and γ", which are derivative terms, are generated only when the curvature changes upon an entrance into or a departure from a curve, and the yaw rate changes as a result of a change in the steering angle corresponding thereto. Those terms are values to be canceled out each other although the timing deviates slightly therebetween. Therefore, if the terms, e'Ld and γ", are omitted simultaneously, the influence is considered to be small, and by omitting those terms, an abrupt change in y'Ld (eventually in the target steering angle θ) can be prevented, and the expression can be simplified. Thus, Expression (14) can be transformed into Expression (16) by assigning Expression (15) and omitting the terms e'Ld and γ".

$$y'Ld = V \cdot eLd + \left(-Ld + \frac{C_f \cdot L_f - C_r \cdot L_r}{C_f + C_r}\right) \cdot \gamma' - \frac{C_f \cdot V}{C_f + C_r}\theta \quad (16)$$

Thus, Expression (17) is acquired by assigning Expression (16), which is the lateral acceleration, to Expression (1), and rearranging Expression (1) in terms of θ while θ is considered as the target steering angle.

$$\theta = \frac{C_f + C_r}{C_f \cdot V}\left(\lambda \cdot yLd + V \cdot eLd - \left(Ld - \frac{C_f \cdot L_f - C_r \cdot L_r}{C_f + C_r}\right) \cdot \gamma'\right) \quad (17)$$

Finally, in Expression (17), Expression (1) is acquired by replacing coefficients k1 to k3 by Expression (18) to Expression (20).

$$k1 = \frac{C_f + C_r}{C_f \cdot V}\lambda = \frac{k2}{V}\lambda \quad (18)$$

$$k2 = \frac{C_f + C_r}{C_f} \quad (19)$$

$$k3 = \frac{C_f + C_r}{C_f \cdot V}\left(Ld - \frac{C_f \cdot L_f - C_r \cdot L_r}{C_f + C_r}\right) = \frac{k2}{V}\left(Ld - \frac{C_f \cdot L_f - C_r \cdot L_r}{C_f + C_r}\right) \quad (20)$$

$$\theta = k1 \cdot yLd + k2 \cdot eLd - k3 \cdot \gamma' \quad (1)$$

where θ represents the target steering angle, k1 to k3 represent the coefficients, yLd represents the lateral displacement at the forward gazing-point distance, eLd represents the target travel line inclination at the forward gazing-point distance, and γ' represents the yaw rate.

Regarding the values included in the coefficients k1 to k3, Lf and Lr are the distances between the center of gravity and the axles, and are thus fixed values determined for each vehicle, but Cf and Cr are values relating to friction forces of the tires, and change depending on the road surface state and the tires, and λ is a value relating to a control response and thus needs to be changed depending on the situation. Further, k1 and K3 include the vehicle speed and Ld needs to be changed depending on the vehicle speed, and hence the coefficients k1 to k3 need to be changed depending on the vehicle state amount. Particularly, for a vehicle speed at which the influence of a change in the steering angle on the vehicle behavior change is large, or for a low friction coefficient (μ) road, the response of the steering angle control needs to be suppressed, and the coefficients k1 to k3 need to be changed depending on the road surface friction coefficient having a large influence on Cf and Cr.

Regarding the target steering angle acquired from Expression (17), when the target steering angle becomes an excessively large value, the value may depart from a condition that allows the application of the two-wheel model, and additionally, Cf and Cr characteristics are changed greatly, and hence the target steering angle needs to be limited. As a result, the vehicle can be prevented from becoming unstable. Moreover, an abrupt change in the vehicle behavior is not desirable, and a change amount of the target steering angle per unit time also needs to be limited.

The steering control section 29 calculates the steering torque based on the target steering angle acquired by the target steering angle calculation section 26, and outputs the drive signal for causing the target current to flow through the motor 3. The steering torque only needs to be acquired as torque corresponding to the target steering angle by using a steering torque characteristic corresponding to the steering angle acquired in advance, and the drive signal is acquired from a motor characteristic as a target current for generating the steering torque. The steering torque characteristic corresponding to the steering angle of the steering device 4 and the motor characteristic of the motor 3 are stored in advance in the storage section M, which is the memory 103.

Figure 6:
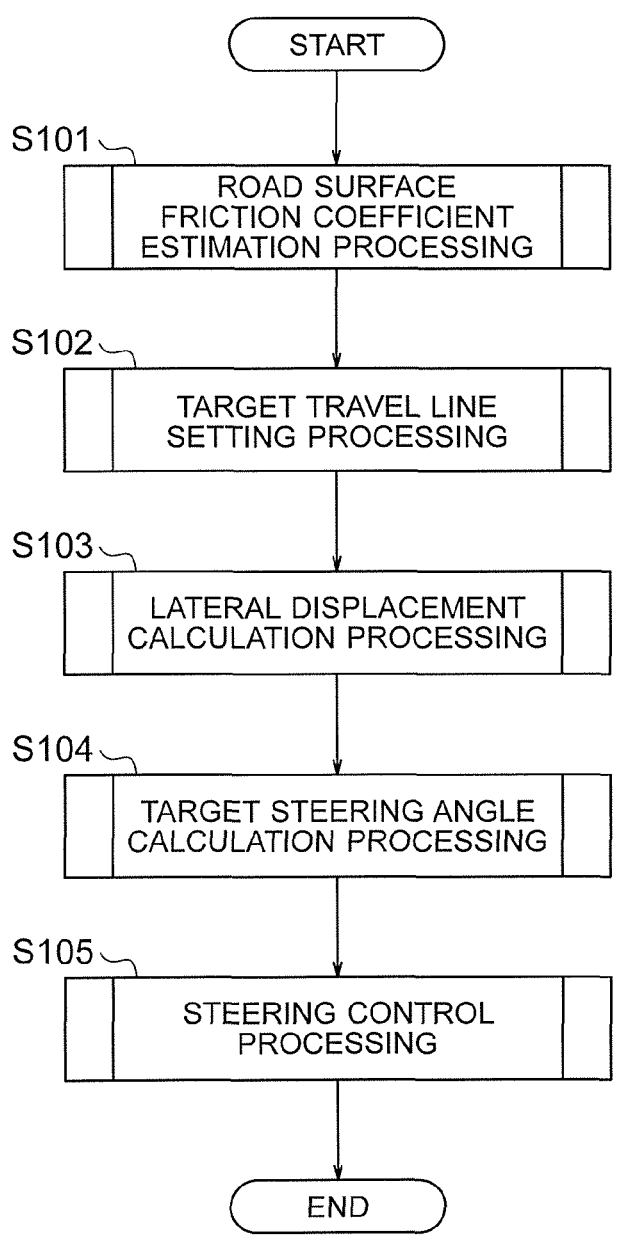
FIG. 6 is an operation flowchart for illustrating processing in the control unit of the vehicle steering device according to the first embodiment and a second embodiment of the present invention.

A description is now given of an operation of the vehicle steering device according to the embodiment of the present invention. FIG. 6 is an operation flowchart for illustrating processing carried out at a constant cycle (such as 0.01 second) in the vehicle steering device according to the first embodiment of the present invention.

In FIG. 6, first, in Step S101 (road surface friction coefficient estimation section 28), road surface friction coefficient estimation processing is carried out to acquire a road surface friction coefficient estimated value. As described above, a publicly known method may be used as the estimation method, and the road surface friction coefficient estimated value only needs to be estimated from the road surface reaction torque received by the tire of the vehicle from the road surface. The estimated value acquired on this occasion is used to correct the coefficients used to calculate the target steering angle.

Then, in Step S102 (target travel line setting section 22), target travel line setting processing is carried out to set a target travel line line_tg. The target travel line line_tg is set to, for example, a value that is ½ of the travel path width with reference to the lane boundary line on the right side.

In Step S103 (lateral displacement calculation section 23), lateral displacement calculation processing is carried out to calculate the lateral displacement yLd of the vehicle. First, the own vehicle position is calculated as the distance from the lane boundary line on the right side, and a value acquired by subtracting the target travel line line_tg from the acquired own vehicle position is calculated as the lateral displacement. When the distance from the lane boundary line on the right side cannot be detected but only the distance from the lane boundary line on the left side is detected, a value acquired by subtracting the distance from the lane boundary line on the left side from the travel path width is calculated as the distance from the lane boundary line on the right side.

In Step S104 (target steering angle calculation section 26), target steering angle calculation processing is carried out to calculate a target steering angle ang_tg. A calculation method is detailed later (FIG. 7).

Finally, in Step S105 (steering control section 29), steering control processing is carried out, and the drive signal is output to the motor 3, to thereby finish the processing. First, the target steering torque is acquired as torque corresponding to the target steering angle by using the steering torque characteristic corresponding to the steering angle acquired in advance. Based on the acquired target steering torque, a target current Imtr_tg for generating the steering torque is acquired by using the motor characteristic. The target current Imtr_tg is output as the drive signal, to thereby drive the motor 3.

Figure 7:
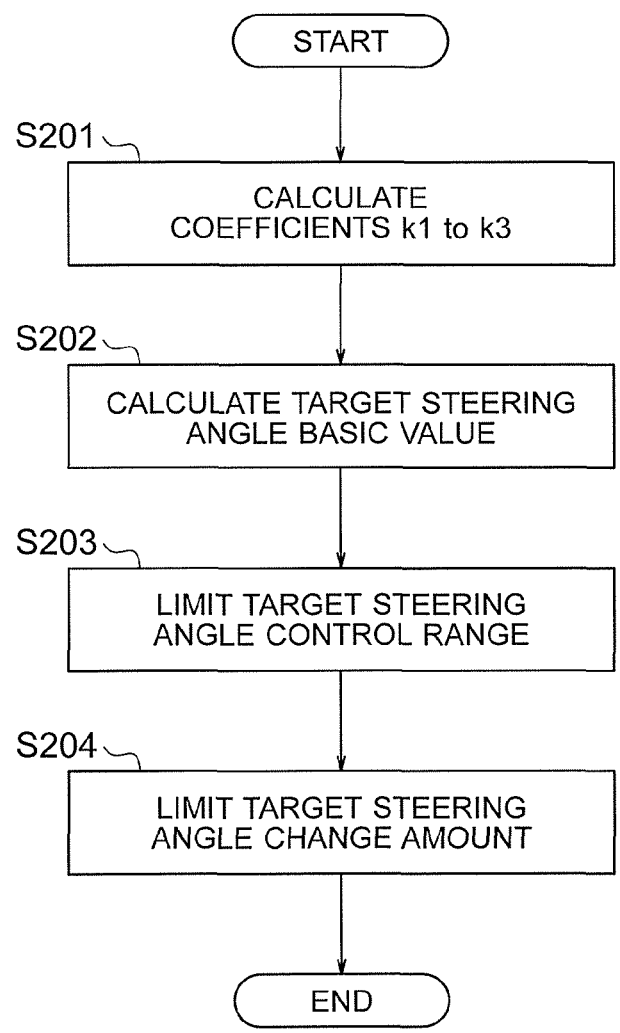
FIG. 7 is an operation flowchart for illustrating details of target steering angle calculation processing of FIG. 6 according to the first embodiment of the present invention.

Then, referring to FIG. 7, a detailed description is now given of the target steering angle calculation processing of Step S104 (target steering angle calculation section 26). In FIG. 7, in Step S201, the coefficients k1 to k3 in Expression (1), which is a calculation expression for a target steering angle basic value ang_bs, are calculated. The coefficients k1 to k3 are acquired by Expression (18) to Expression (20).

First, k2 is calculated based on Cf and Cr set in correspondence to the road surface friction coefficient estimated value.

The coefficient k1 is a value acquired by multiplying k2 by $\lambda/V$, and has such a characteristic as to decrease as the vehicle speed increases. Moreover, $\lambda$ is a value relating to the control response. However, as the road surface friction coefficient $\mu$ decreases, a range of the sideslip angle dealt with by Cf and Cr decreases, and hence the target steering angle needs to be decreased as the road surface friction coefficient $\mu$ decreases. Thus, the response characteristic needs to be decreased as the road surface friction coefficient estimated value decreases. Therefore, k1 is set so as to decrease as the vehicle speed increases and the road surface friction coefficient estimated value decreases.

Regarding k3, it is preferred that Ld be increased as the vehicle speed increases (such as a travel distance in a set period of approximately 1 second), and hence k3 is set based on Ld that is set independently and the set values of Cf and Cr, in addition to the vehicle speed.

In Step S202, the target steering angle basic value ang_bs is calculated by using Expression (1).

The target steering angle basic value ang_bs is calculated by assigning the following values to Expression (1):
the coefficients k1 to k3 calculated in Step S201;
the lateral displacement yLd at the forward gazing-point distance calculated in Step S103;
the target travel line inclination eLd at the forward gazing-point distance acquired from the travel path recognition section 21; and
the yaw rate $\gamma'$ acquired from the yaw rate detection section 25.

In Step S203, for the acquired ang_bs, a limited target steering angle basic value ang_clp is calculated. When the target steering angle becomes an excessively large value, the value may depart from the condition that allows the application of the two-wheel model. In addition, the Cf and Cr characteristics are also greatly changed. Therefore, the target steering angle is limited. Moreover, when the steering angle increases during the high speed travel, a centrifugal force increases, and hence the limitation is also necessary to suppress the lateral acceleration. Therefore, for ang_bs, a value limited to a range of the steering angle corresponding to the range of the sideslip angle dealt with by Cf and Cr depending on the road surface friction coefficient estimated value, and also limited to a range of the steering angle in which the lateral acceleration falls within a set value (such as 0.2 G) depending on the vehicle speed is calculated as ang_clp.

Finally, in Step S204, for the acquired ang_clp, the target steering angle ang_tg is calculated, and the target steering angle calculation processing is finished. An abrupt change in the vehicle behavior is not desirable, and the change amount of the target steering angle per unit time is thus limited. As the vehicle speed increases, the vehicle behavior change increases with respect to the steering angle change, and such a limitation as to decrease the change amount as the vehicle speed increases is thus imposed. A previous target steering angle ang_tg_old is stored, and a change amount limitation value dlt_ang is set in accordance with the vehicle speed. Then, a value limited to a range of ang_tg_old±dlt_ang is for ang_clp is calculated as the target steering angle ang_tg.

Note that, FIG. 2 is referred to above as the functional block diagram of the control unit, but may be a functional block diagram of the entire vehicle steering device.

In this case, the travel path recognition section 21 further includes the camera 8. The travel path recognition section 21 takes the forward image in order to recognize the travel path, and provides the forward travel path information to the target travel line setting section 22, the lateral displacement calculation section 23, and the target steering angle calculation section 26.

The vehicle speed detection section 24 further includes the wheel speed sensor 6. The vehicle speed detection section 24 detects the vehicle speed, and provides the vehicle speed to the target steering angle calculation section 26.

The yaw rate detection section 25 further includes the yaw rate sensor 7. The yaw rate detection section 25 detects the yaw moment of the vehicle, and provides the yaw moment to the target steering angle calculation section 26.

The road surface friction coefficient estimation section 28 uses a publicly known method to estimate the road surface friction coefficient, and provides the road surface friction coefficient to the target steering angle calculation section 26. The road surface friction coefficient estimation section 28 further includes the steering device 4 including the road surface reaction torque sensor (not shown in detail).

Moreover, the vehicle speed detection section 24 and the yaw rate detection section 25 construct a vehicle state amount detection section, and the vehicle speed and the yaw rate constitute the vehicle state amounts.

Second Embodiment

In the first embodiment, the target steering angle is converted into the steering torque to drive the motor 3 for the control of the steering angle, but, in order to more precisely carry out the steering angle control, an actual steering angle may be detected, and feedback control may be carried out so that the actual steering angle becomes the target steering angle.

Figure 8:
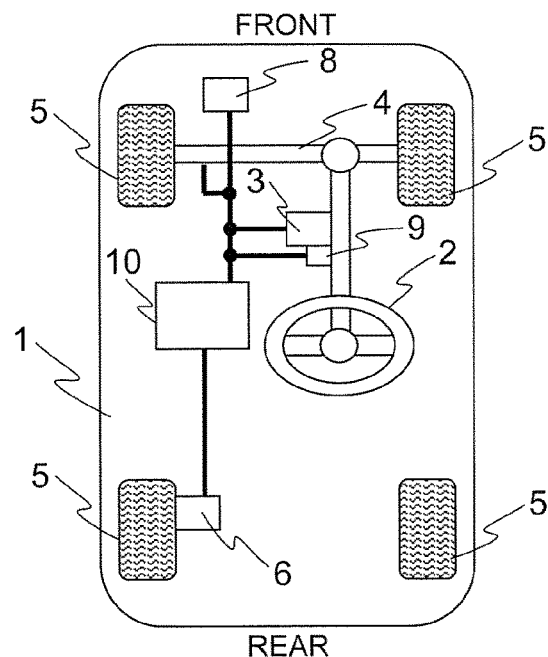
FIG. 8 is a configuration diagram for illustrating an example of a steering system configuration for the vehicle steering device according to the second embodiment of the present invention.

FIG. 8 is a configuration diagram for illustrating an example of a steering system configuration for a vehicle steering device according to a second embodiment of the present invention. As a modification from the first embodiment, a steering angle sensor 9 is mounted in place of the yaw rate sensor. The actual steering angle is detected by the steering angle sensor 9, and hence feedback control can be carried out so that the actual steering angle becomes the target steering angle, and further the yaw rate sensor can be eliminated by estimating the yaw rate by a publicly known method.

Figure 9:
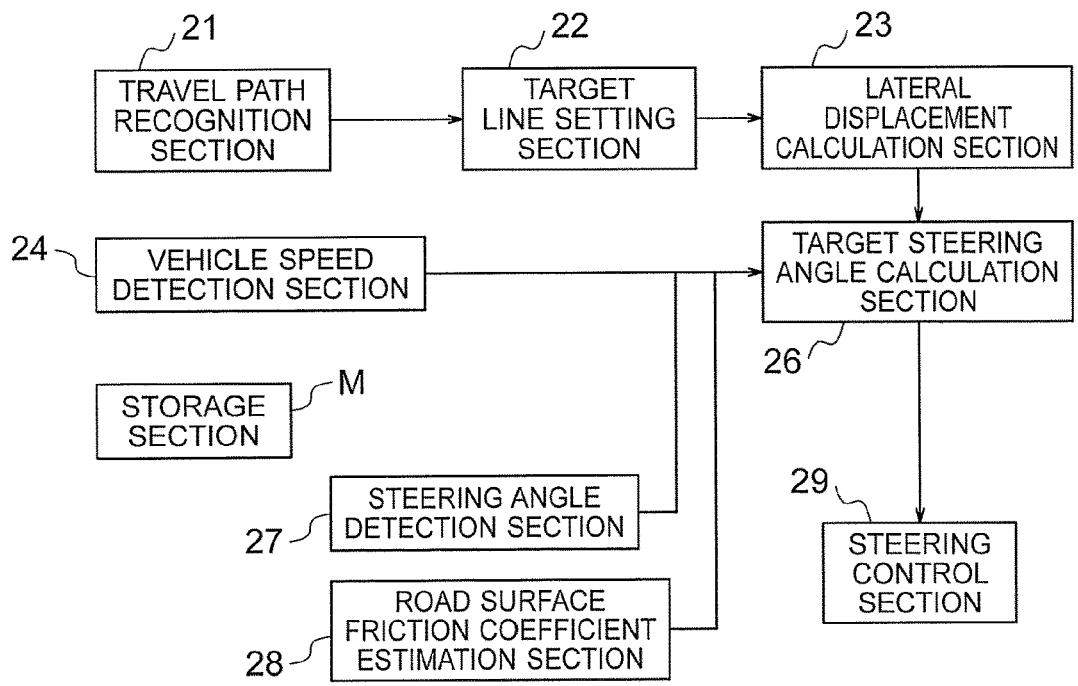
FIG. 9 is a functional block diagram of the vehicle steering device and the control unit of FIG. 8.

FIG. 9 is a functional block diagram of the vehicle steering device and the control unit 10 of FIG. 8. In the following description, FIG. 9 is a functional block diagram of the control unit 10. Processing by the respective functional blocks is carried out by the processor 102 in accordance with the programs stored in the memory 103 of FIG. 11. As a modification from the first embodiment, the yaw rate detection section 25 is eliminated, and a steering angle detection section 27 is added. The steering angle detection section 27 inputs an actual steering angle signal of the actual steering angle detected by the steering angle sensor 9, and provides the actual steering angle to the target steering angle calculation section 26.

Moreover, processing of estimating the yaw rate is added to the target steering angle calculation section 26 in addition to the functions of the first embodiment. Further, the steering control section 29 carries out, in place of the calculation of the steering torque, feedback control so that the actual steering angle becomes the target steering angle, to thereby output the drive signal for the motor 3.

Differences from the first embodiment (FIG. 6) in the processing by the control unit 10 are contents of the target steering angle calculation processing of Step S104 and the steering control processing of Step S105. The steering control processing of Step S105 has, as described above, a function of carrying out the feedback control so that the actual steering angle becomes the target steering angle. The feedback control only needs to be a publicly known method, and the drive signal (target current) for the motor 3 only needs to be acquired by proportional-integral-derivative (PID) control or the like so that the difference between the actual steering angle and the target steering angle is reduced.

Figure 10:
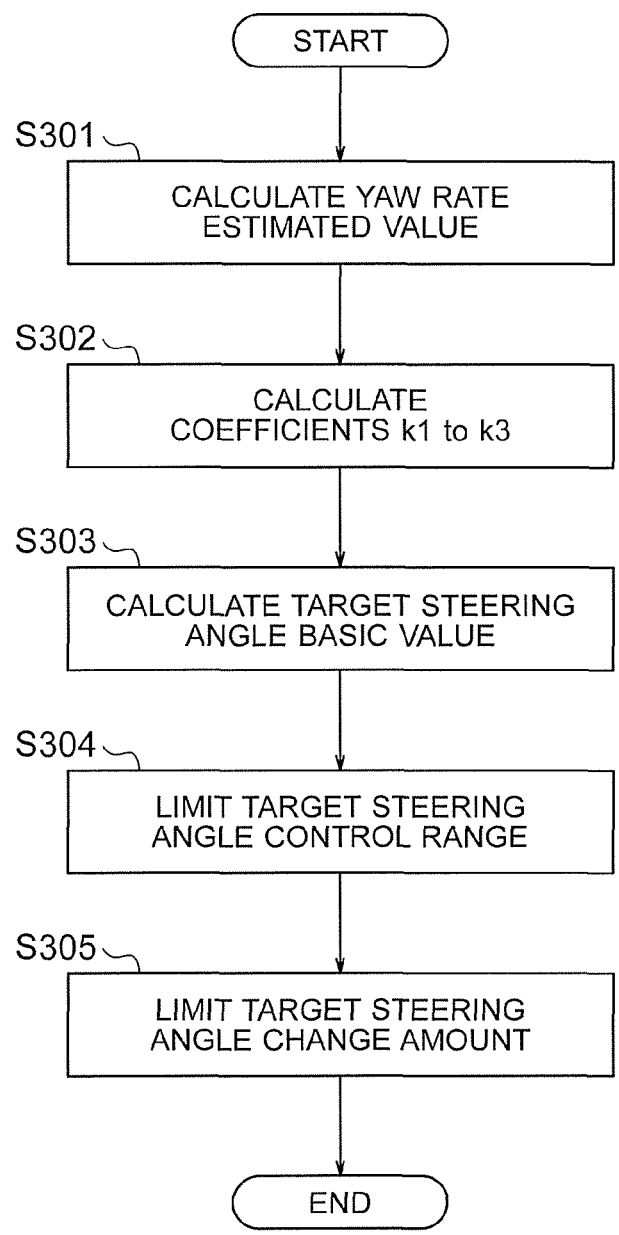
FIG. 10 is an operation flowchart for illustrating details of the target steering angle calculation processing of FIG. 6 according to the second embodiment of the present invention.

Referring to FIG. 10, a description is now given of the target steering angle calculation processing of Step S104. In FIG. 10, in Step S301, a yaw rate estimated value is calculated based on the actual steering angle. As a calculation method, the vehicle speed and the yaw rate generated from the actual steering angle only need to be stored in the storage section M (memory 103) in advance as a relationship among the vehicle speed, the actual steering angle, and the yaw rate, and the yaw rate estimated value only needs to be acquired by referring to the relationship. Moreover, the two-wheel model or the like may be used to appropriately acquire the yaw rate estimated value. Step S302 to Step S305 after Step S301 are respectively the same as Step S201 to Step S204 of FIG. 7 according to the first embodiment, and the target steering angle calculation by using Expression (1) is also the same. Note that, as the yaw rate $\gamma'$ used in Step S303, the yaw rate estimated value calculated in Step S301 is used.

In this embodiment, as the steering control section 29, the electric power steering device is used as a base, but the steering control section 29 only needs to be configured to control the steering, and may be, for example, a steering device called steering-by-wire, which eliminates a mechanical link between the steering wheel and the steered wheels.

The device used for the travel path recognition section 21 and the lateral displacement calculation section 23 is not limited to the camera 8. For example, map information and own vehicle position information acquired from a car navigation system using the global positioning system (GPS) may be used to recognize the travel path and the own vehicle position. Moreover, the detection of the yaw angle only needs to be carried out by integrating the yaw rate, or comparing the target travel line and the actual travel locus with each other.

A description is given above of the system intended for the lane keeping assistance, but the present invention is not limited thereto. The present invention may be used for a parking assistance system, an automated vehicle operation system, and the like. The present invention can be applied when the steered wheels are steered so as to follow the target travel line set in the respective systems.

Note that, FIG. 9 is referred to above as the functional block diagram of the control unit, but similarly to the above-mentioned embodiment, may be a functional block diagram of the entire vehicle steering device.

In this case, in addition to the above-mentioned embodiment, the steering angle detection section 27 further includes the steering angle sensor 9. The steering angle detection section 27 detects the actual steering angle, and provides the actual steering angle to the target steering angle calculation section 26.

Note that, the present invention is not limited to the respective embodiments, and includes all possible combinations of features of the respective embodiments.

What is claimed is:

1. A vehicle steering device, comprising:
    a travel path recognizer which recognizes a travel path on which a vehicle travels;
    a target travel line setter which sets a target travel line used by the vehicle to travel while following the travel path;
    a lateral displacement calculator which detects a lateral displacement, which is a difference between a position of the target travel line and a position of the vehicle at a forward gazing-point distance of the vehicle;
    a target steering angle calculator which calculates a target steering angle so as to reduce the lateral displacement; and
    a steering controller which controls a steering angle of the vehicle based on the target steering angle calculated by the target steering angle calculator,
    wherein the target steering angle calculator controls a lateral speed, which is a change amount of the lateral displacement, so as to reduce the lateral displacement, and calculates the target steering angle based on the lateral speed; and
    wherein the target steering angle calculator calculates said target steering angle in further consideration of at least yaw rate and target travel line inclination, where yaw rate is a rate of change of the yaw angle of said vehicle relative to said target line, and target travel line inclination is an inclination between a current travel direction of the vehicle and the target travel line at the forward gazing-point distance, the target steering angle calculator calculating the target steering angle according to:

$$\theta = k1 \cdot yLd + k2 \cdot eLd - k3 \cdot \gamma'$$

where $\theta$ represents the target steering angle, k1 to k3 represent coefficients, yLd represents the lateral displacement at the forward gazing-point distance, eLd represents the target travel line inclination at the forward gazing-point distance, and $\gamma'$ represents the yaw rate.

2. The vehicle steering device according to claim 1, further comprising:
    a vehicle state detector which detects a vehicle state of the vehicle, said vehicle state including at least one of a vehicle speed, or a road surface friction coefficient;
    wherein the travel path recognizer detects said target travel line inclination, and
    wherein the target steering angle calculator calculates the target steering angle further in accordance with the vehicle state.

3. The vehicle steering device according to claim 2, further comprising a steering angle detector which detects an actual steering angle of the vehicle,
    wherein the target steering angle calculator estimates the yaw rate based on the actual steering angle.

4. The vehicle steering device according to claim 1, wherein the target steering angle calculator changes the coefficients k1 to k3 depending on the detected vehicle state.

5. The vehicle steering device according to claim 4, wherein the vehicle state detector comprises a vehicle speed detector which detects a speed of the vehicle, and the vehicle state comprises the vehicle speed.

6. The vehicle steering device according to claim 4, wherein the vehicle state detector comprises a road surface friction coefficient estimator which estimates a friction coefficient between a road surface on which the vehicle is traveling and a tire, and the vehicle state comprises said road surface friction coefficient.

7. The vehicle steering device according to claim 1, wherein the target steering angle calculator calculates the target steering angle while limiting a rate of change of the target steering angle.

8. The vehicle steering device according to claim 1, wherein the target steering angle calculator calculates the target steering angle while limiting the target steering angle.

9. The vehicle steering device according to claim 1, wherein the steering controller converts the target steering angle into a steering torque, to thereby control an actual steering angle of the vehicle.

10. The vehicle steering device according to claim 1, further comprising a steering angle detector which detects an actual steering angle of the vehicle,
    wherein the steering controller carries out feedback control so that the actual steering angle of the vehicle becomes the target steering angle.

11. The vehicle steering device according to claim 10, wherein the target steering angle calculator calculates the target steering angle while limiting a rate of change of the target steering.

12. The vehicle steering device according to claim 10, wherein the target steering angle calculator calculates the target steering angle while limiting the target steering angle.

13. A vehicle steering control method, comprising the steps of:
    recognizing a travel path on which a vehicle travels;
    setting a target travel line used by the vehicle to travel while following the travel path;
    detecting a lateral displacement, which is a difference between a position of the target travel line and a position of the vehicle at a forward gazing-point distance of the vehicle;
    calculating a target steering angle so as to reduce the lateral displacement; and
    controlling a steering angle of the vehicle based on the target steering angle,
    wherein the step of calculating a target steering angle comprises controlling a lateral speed, which is a rate of change of the lateral displacement, so as to reduce the lateral displacement, and calculating the target steering angle based on the lateral speed; and
    wherein said step of calculating the target steering angle further takes into account at least yaw rate and target travel line inclination, where yaw rate is a rate of change of the yaw angle of said vehicle relative to said target line, and target travel line inclination is an inclination between a current travel direction of the vehicle and the target travel line at the forward gazing-point, said target steering angle calculator calculating the target steering angle according to:

$$\theta = k1 \cdot yLd + k2 \cdot eLd - k3 \cdot \gamma'$$

where $\theta$ represents the target steering angle, k1 to k3 represent coefficients, yLd represents the lateral displacement at the forward gazing-point distance, eLd represents the target travel line inclination at the forward gazing-point distance, and $\gamma'$ represents the yaw rate.

14. A vehicle steering device, comprising:
    a travel path recognizer which recognizes a travel path on which a vehicle travels;

a target travel line setter which sets a target travel line used by the vehicle to travel while following the travel path;

a lateral displacement calculator which detects a lateral displacement, which is a difference between a position of the target travel line and a position of the vehicle at a forward gazing-point distance of the vehicle;

a target steering angle calculator which calculates a target steering angle so as to reduce the lateral displacement; and a steering controller which controls a steering angle of the vehicle based on the target steering angle calculated by the target steering angle calculator, wherein the target steering angle calculator controls a lateral speed, which is a change amount of the lateral displacement, so as to reduce the lateral displacement, and calculates the target steering angle based on the lateral speed;

wherein the target steering angle calculator calculates said target steering angle in further consideration of at least one of yaw rate or target travel line inclination, where yaw rate is a rate of change of the yaw angle of said vehicle relative to said target line, and target travel line inclination is an inclination between a current travel direction of the vehicle and the target travel line at the forward gazing-point distance; and wherein the target steering angle calculator calculates the target steering angle while limiting the target steering angle.

15. A vehicle steering control method, comprising the steps of:

recognizing a travel path on which a vehicle travels;

setting a target travel line used by the vehicle to travel while following the travel path;

detecting a lateral displacement, which is a difference between a position of the target travel line and a position of the vehicle at a forward gazing-point distance of the vehicle;

calculating a target steering angle so as to reduce the lateral displacement; and controlling a steering angle of the vehicle based on the target steering angle, wherein the step of calculating a target steering angle comprises controlling a lateral speed, which is a rate of change of the lateral displacement, so as to reduce the lateral displacement, and calculating the target steering angle based on the lateral speed;

wherein said step of calculating the target steering angle further takes into account at least one of yaw rate or target travel line inclination, where yaw rate is a rate of change of the yaw angle of said vehicle relative to said target line, and target travel line inclination is an inclination between a current travel direction of the vehicle and the target travel line at the forward gazing-point distance; and wherein the target steering angle calculator calculates the target steering angle while limiting the target steering angle.

16. A vehicle steering device, comprising:

a travel path recognizer which recognizes a travel path on which a vehicle travels;

a target travel line setter which sets a target travel line used by the vehicle to travel while following the travel path;

a lateral displacement calculator which detects a lateral displacement, which is a difference between a position of the target travel line and a position of the vehicle at a forward gazing-point distance of the vehicle;

a target steering angle calculator which calculates a target steering angle so as to reduce the lateral displacement;

a steering angle detector which detects an actual steering angle of the vehicle; and a steering controller which controls a steering angle of the vehicle based on the target steering angle calculated by the target steering angle calculator, wherein the target steering angle calculator controls a lateral speed, which is a change amount of the lateral displacement, so as to reduce the lateral displacement, and calculates the target steering angle based on the lateral speed;

wherein the target steering angle calculator calculates said target steering angle in further consideration of at least one of yaw rate or target travel line inclination, where yaw rate is a rate of change of the yaw angle of said vehicle relative to said target line, and target travel line inclination is an inclination between a current travel direction of the vehicle and the target travel line at the forward gazing-point distance; and wherein the steering controller carries out feedback control so that the actual steering angle of the vehicle becomes the target steering angle.

17. A vehicle steering control method, comprising the steps of:

recognizing a travel path on which a vehicle travels;

setting a target travel line used by the vehicle to travel while following the travel path;

detecting a lateral displacement, which is a difference between a position of the target travel line and a position of the vehicle at a forward gazing-point distance of the vehicle;

calculating a target steering angle so as to reduce the lateral displacement;

detecting an actual steering angle of the vehicle, and controlling a steering angle of the vehicle based on the target steering angle, wherein the step of calculating a target steering angle comprises controlling a lateral speed, which is a rate of change of the lateral displacement, so as to reduce the lateral displacement, and calculating the target steering angle based on the lateral speed;

wherein said step of calculating the target steering angle further takes into account at least one of yaw rate or target travel line inclination, where yaw rate is a rate of change of the yaw angle of said vehicle relative to said target line, and target travel line inclination is an inclination between a current travel direction of the vehicle and the target travel line at the forward gazing-point distance; and wherein said controlling step carries out feedback control so that the actual steering angle of the vehicle becomes the target steering angle.

18. A vehicle steering device, comprising:

a travel path recognition section for recognizing a travel path on which a vehicle travels;

a target travel line setting section for setting a target travel line used by the vehicle to travel while following the travel path;

a lateral displacement calculation section for detecting a lateral displacement, which is a difference between a position of the target travel line and a position of the vehicle at a forward gazing-point distance of the vehicle;

a target steering angle calculation section for calculating a target steering angle so as to reduce the lateral displacement; and a steering control section for controlling a steering angle of the vehicle based on the target steering angle calculated by the target steering angle calculation section, wherein the target steering angle calculation section controls a lateral speed, which is a change amount of the lateral displacement, so as to reduce the lateral displacement, by calculating as follows, the lateral speed=$-\lambda \cdot yLd$ yLd: the lateral displacement, which is a difference between a position of the target travel line and a position of the vehicle at a forward gazing-point distance of the vehicle;

$\lambda$: an attenuation characteristic parameter of yLd (a positive value) and calculates the target steering angle based on the lateral speed.

19. A vehicle steering control method, comprising the steps of:

recognizing a travel path on which a vehicle travels;

setting a target travel line used by the vehicle to travel while following the travel path;

detecting a lateral displacement, which is a difference between a position of the target travel line and a position of the vehicle at a forward gazing-point distance of the vehicle;

calculating a target steering angle so as to reduce the lateral displacement; and controlling a steering angle of the vehicle based on the target steering angle, wherein the calculating a target steering angle comprises controlling a lateral speed, which is a change amount of the lateral displacement, so as to reduce the lateral displacement, by calculating as follows, the lateral speed=$-\lambda \cdot yLd$ yLd: the lateral displacement, which is a difference between a position of the target travel line and a position of the vehicle at a forward gazing-point distance of the vehicle $\lambda$: an attenuation characteristic parameter of yLd (a positive value) and calculating the target steering angle based on the lateral speed.

* * * * *